United States Patent [19]

Forman et al.

[11] Patent Number: 5,544,310
[45] Date of Patent: Aug. 6, 1996

[54] SYSTEM AND METHOD FOR TESTING DISTRIBUTED SYSTEMS

[75] Inventors: Ira R. Forman; Hari H. Madduri, both of Austin, Tex.

[73] Assignee: International Business Machines Corporation, Armonk, N.Y.

[21] Appl. No.: 318,017

[22] Filed: Oct. 4, 1994

[51] Int. Cl.$^6$ .................................................. G06F 11/34
[52] U.S. Cl. ..................... 395/183.07; 395/650
[58] Field of Search .................................. 395/575, 200, 395/650, 183.01, 183.07, 183.14, 200.02, 200.05; 364/242.94, 242.95, 242.96; 371/20.4, 19; 379/219

[56] References Cited

U.S. PATENT DOCUMENTS

| | | | |
|---|---|---|---|
| 5,067,072 | 11/1991 | Talati et al. | 395/650 |
| 5,271,000 | 12/1993 | Engbersen et al. | 370/13 |
| 5,307,490 | 4/1994 | Davidson et al. | 395/650 |
| 5,325,518 | 6/1994 | Bianchini, Jr. | 395/575 |

OTHER PUBLICATIONS

*Metaclass Compatibility*, N. Graube, OOPSLA '89 Proceedings (Oct. 1989), pp. 305–315.

*Proteus: A Frame–Based Nonmontonic Inference System*, D. Russinoff, *Object–Oriented Concepts, Databases and Applications*, Kim, W. and Lochovskey, F. H. (ed.) ACM Press, New York (1989) pp. 127–150.

*Object–Oriented Programming in OS/2 2.0*, Roger Sessions and Nurcan Coskun, *IBM Personal Systems Developer* (Winter 1992).

*Class Objects in SOM*, Roger Sessions and Nurcan Coskun, *IBM Personal Systems Developer* (Summer 1992), pp. 67–77.

*Metaclasses are First Class: The ObjVlisp Model*, P. Cointe, OOPSLA '87 Proceedings (Oct. 1987), pp. 156–167.

*Programming with Explicit Metaclasses in Smalltalk–80*, J. Briot and P. Cointe, OOPSLA '89 Proceedings (Oct. 1989), pp. 419–431.

Primary Examiner—Robert W. Beausoliel, Jr.
Assistant Examiner—Albert Décady
Attorney, Agent, or Firm—Mark S. Walker; Jenkens & Gilchrist, P.C.

[57] ABSTRACT

In a distributed data processing system or network testing a distributed processing program is achieved by a test manager and a test scenario. Functionally, the test manager reads the test scenario to identify processes of the system to be tested. The identified processes then read relevant portions of the test scenario and executes such portions. While the processes are executing the scenario portions, the test manager monitors resulting data from each process. If the resulting data does not match an expected data value, the test manager flags an error regarding the process that produced the errant data.

14 Claims, 6 Drawing Sheets

SYSTEM AND METHOD FOR TESTING DISTRIBUTED SYSTEMS

TECHNICAL FIELD OF THE INVENTION

The present invention relates generally to data processing systems, and more particularly, to a system and method for testing a distributed processing system.

BACKGROUND OF THE INVENTION

A distributed data processing system typically allows for the sharing among locations or facilities of data processing functions by a collection of computers, and other devices linked together by a communications facility such as a network. Quite often, such distributed processing requires a highly structured environment, which allows hardware and software to communicate, share resources, and freely exchange information.

Developing program code for operating such distributed systems is difficult and time consuming. One of the most difficult tasks in the development of a distributed processing program is testing of the program. Many bugs in distributed processing programs either appear or disappear because of the relative timing of the events that occur at various nodes. With debugging programs, it is important to be able to reproduce erroneous behavior consistently. Distributed processing programs are inherently non-deterministic, and therefore make testing and debugging extremely difficult.

Typically, testing and debugging distributed processing programs involve running the several components of the program from controlled environments (e.g., debuggers) and causing the events in the system to occur in a controlled manner. Although this approach is effective, it is very time consming for regression testing. That is, making sure that the new "fixes" have not undone the "fixes" for the old bugs is very tedious with such an approach. Thus, such typical testing methods suffer from the lack of a deterministic timing behavior and an automatic means for regression testing.

Therefore, there is a need in the art for a testing technique for distributed processing programs that is automatic, deterministic, and allows for regression testing.

SUMMARY OF THE INVENTION

Thus, it is an object of the present invention to test distributed processing system programming in an efficient, automatic, and deterministic manner.

In an attainment of this object, the present invention is implemented within a test managing program that exercises various components of the distributed processing system program according to a pre-defined scenario. Each component of the distributed processing program reads and interprets a portion of the scenario, which may be an ASCII text file that describes the steps to be executed by each component of the distributed processing program. The scenario specifies a sequence of events to happen at any given component of the distributed processing program, verifies whether a component's response to an event is as expected, synchronizes a component with respect to events in another component, and introduces time delays in the execution of a component.

More specifically, the present invention begins two or more separate processes within the distributed system, each process implementing a separate portion of the scenario. Typically, the processes in a distributed system send information to one another. Therefore, the scenario is configured so that the two or more processes are required to transfer information between themselves, and then this information is observed. The transfer of this information is the responsibility of the distributed system being tested. The present invention is illustrated by considering a replication framework as the distributed system under test.

An example test that may be implemented through the use of a scenario determines whether or not the replication framework operates adequately to transfer the information from a first process to a second process. The simplest test of the replication framework involves two processes each with a "test" object in it. When one process changes the value of the "test" object, the replication framework carries this change information to the other "test" object (in the second process). To know if the framework is working correctly, a scenario that makes the first process make a change in the test object and then has the second process verify the same change in its test object would be needed. In general, scenarios may be configured in a numerous variety of ways so that various components of the distributed processing system can be tested to determine whether or not they operate as designed. For example, in the case of the replication framework, if a certain value is or is not received at a certain point within the system, or if the value has or has not changed from an expected value, it indicates that the replication framework is not working as expected.

A technical advantage of the present invention is that it may be implemented through the use of short test scenarios rather than requiring the writing of a complete test program.

Another technical advantage of the present invention is that the test scenarios can be written to create predictable sequences of events for the distributed program components, thereby introducing determinism to allow debugging.

Yet another technical advantage of the present invention is that it allows for regression testing since the running of the scenarios can be automated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1A:
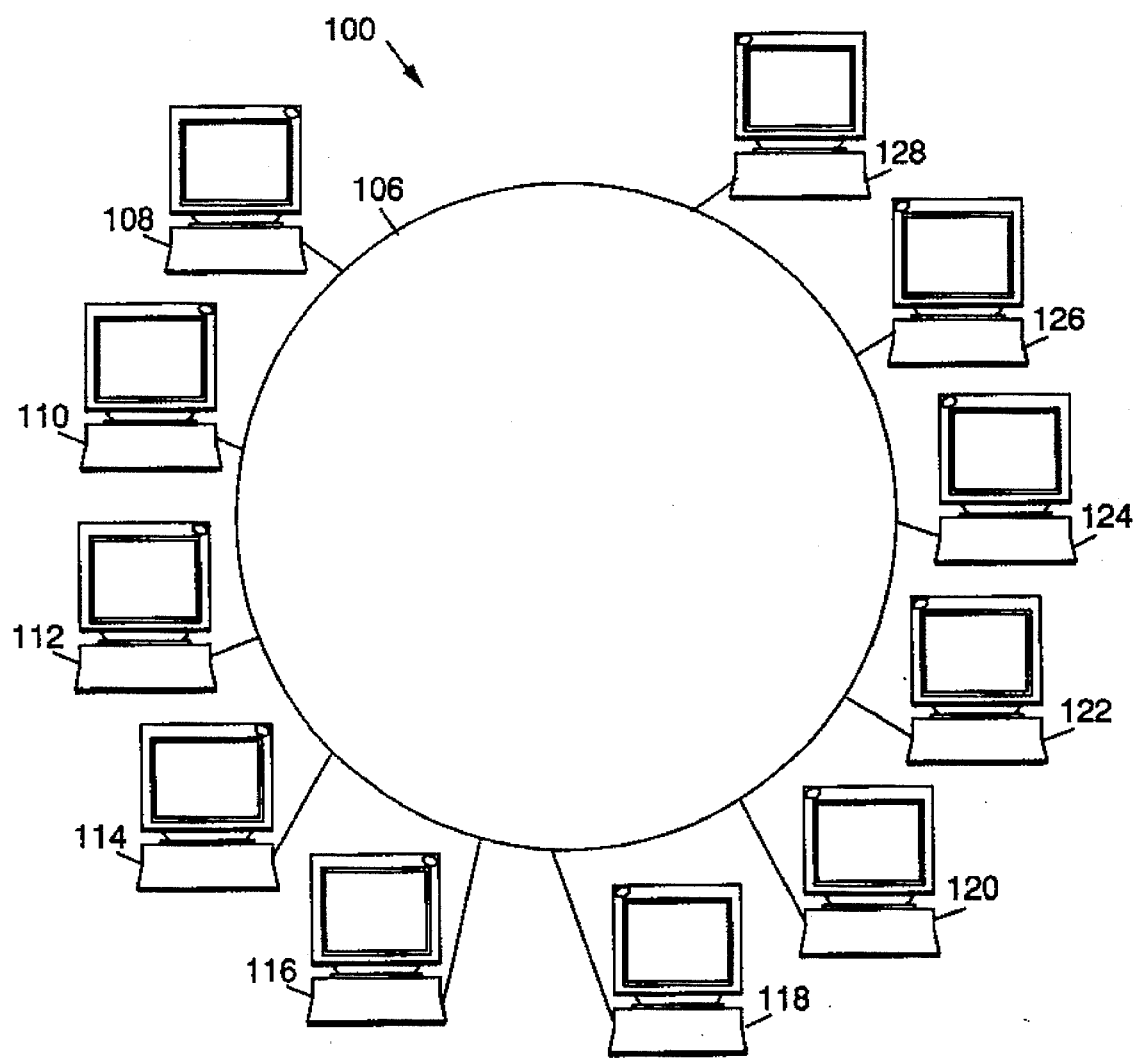
FIG. 1A illustrates a typical distributed processing system for which the present invention:is designed.

Referring to FIG. 1A, there is illustrated distributed processing system 100 having data processing systems 108, 110, 112, 114, 116, 118, 120, 122, 124, 126 and 128 connected thereto in a conventional manner. Network 106 may be a local area network, a wide area network, or a nationwide or international data transmission network or the like, such as the Internet.

Figure 1B:
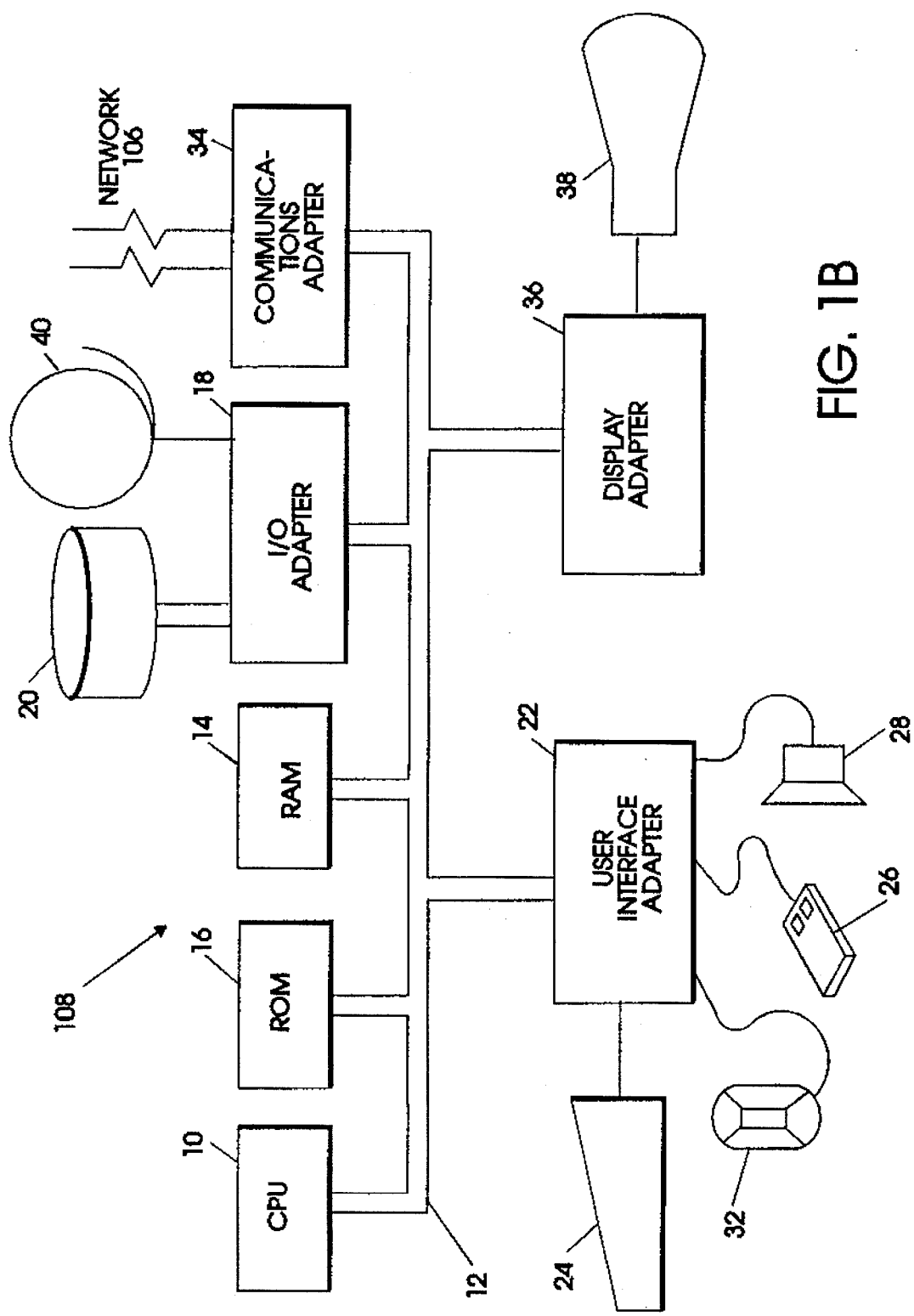
FIG. 1B illustrates a data processing system for implementing the present invention.

Referring next to FIG. 1B, there is illustrated a representative hardware environment, which illustrates a typical hardware configuration of data processing system 108 (see FIG. 1A) in accordance with the subject invention having a central processing unit 10, such as a conventional microprocessor, and a number of other units interconnected via system bus 12. System 108 shown in FIG. 1B includes random access memory (RAM) 14, read only memory (ROM) 16, I/O adapter 18 for connecting peripheral devices such as disk units 20 and tape drives 40 to bus 12, user interface adapter 22 for connecting keyboard 24, mouse 26, speaker 28, microphone 32, and/or other user interface devices such as a touch screen device (not shown) to bus 12, communications adapter 34 for connecting system 108 to network 106 and display adapter 36 for connecting bus 12 to display device 38.

Figure 2:
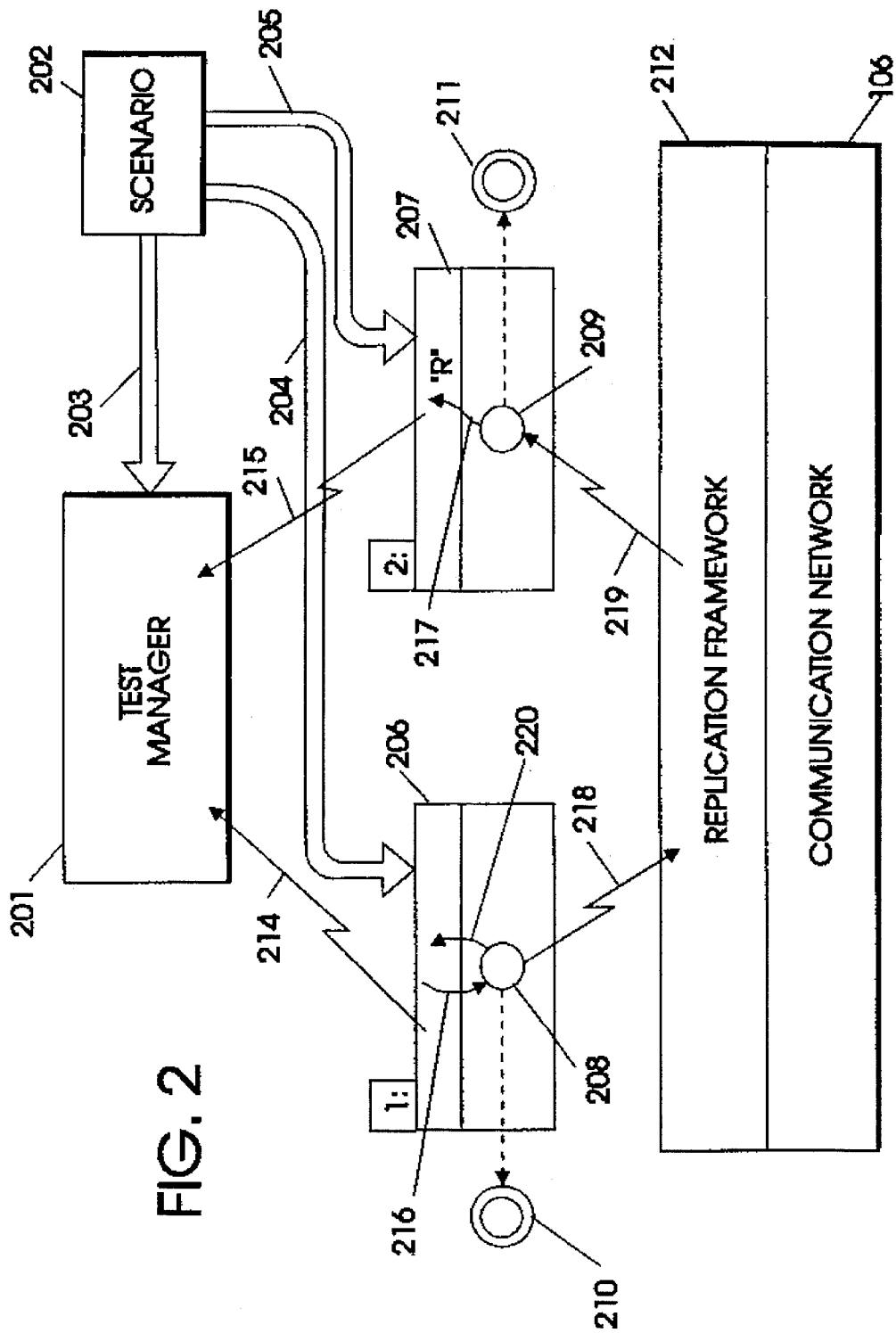
FIG. 2 illustrates a diagram of an exemplary implementation of the present invention.

Referring next to FIG. 2, there is illustrated a diagram of an example implementation of the present invention. In this example, replication framework 212, as may be implemented within a distributed processing system provides the means for one of the processes to receive information generated by another process. Replication framework 212 provides for replicated data systems to implement data sharing by providing a replica copy of a data object to each process using that data object. Replication reduces the access time for each processor by eliminating the need to send messages over the network to retrieve and supply the necessary data. A replicated object is a logical unit of data existing in one of the computer systems but physically replicated to multiple distributed computer systems. Replicated copies are typically maintained in the memories of the distributed systems. For further discussion of replication, please refer to U.S. Pat. No. (Ser. No. 08/077,231) assigned to a common assignee, which is hereby incorporated by reference herein. (Note that this illustration is for verifying the workings of a replication framework referenced earlier; similar scenarios can be written for testing other distribution systems.)

Test manager 201 and processes 206 and 207 may be implemented within any of the dam processing devices illustrated in FIG. 1A and further detailed in FIG. 1B. Furthermore, scenario 202, which may be in the form of an ASCII text file may be stored within any one of the devices within system 100.

Test manager 201 first reads the scenario file 202 as illustrated by arrow 203. Test manager 201 is looking for how many processes there are for testing within distributed system 100, and what machines within network 106 to start these processes on. Thus, test manager 201 scans the whole scenario 202 and determines the processes required. In the example shown, two processes, 1: and 2:, are required by scenario 202. Hereinafter, these processes will be referred to simply as process 1 and process 2. Process 1 and process 2 are similar to test manager 201 in that they will also read scenario 202, as illustrated by arrows 204 and 205, respectively. However, process 1 will ignore all statements within scenario 202 not particularly designated for process 1, while process 2 will likewise only read statements particularly designated for process 2. Each process will then perform operations as designated for that process by scenario 202. Typically, processes 1 and 2 will create objects 208 and 209.

Processes 1 and 2 will then begin sending messages to objects 208 and 209, respectively. Each time a message is sent then the process will check to determine :if the return value from the invoked method is as expected.

For example, message 216 will invoke a method on object 208, and as is typical within object-oriented design, a value 220 will be returned from object 208, and it will be compared to an expected value. For a further discussion of object-oriented programming, please refer to *Object-Oriented Technology; A Manager's Guide*, Taylor, D., Addison-Wesley 1994 and *Object-Oriented Analysis and Design*, Booth, G., 2nd Edition, The Benjamin Publishing Co. 1994, which are hereby incorporated by reference herein.

If at any time a return value is not as expected, test manager 201 will produce an error message. Test manager 201 is able to monitor such information Within processes 1 and 2 via communication "pipelines" 214 and 215, An implementation of pipelines 214 and 215 is well within those skilled in the art.

Processes 1 and 2 may be identical but not necessarily so. However, it is preferred if processes 1 and 2 pass information between each other in some manner.

For example, object 208 may create a value "R" which through communication means 218 and 219 and replication framework 212 is either retrieved or received by object 209, which includes a method for either retrieving or receiving such value.

Process 2 may include a step for observing value "R"(as illustrated by arrow 217). If an "R" is not received, test manager 201, which knows of the receipt of the value "R" via communication pathway 215 (which may be implemented within software), then test manager 201 will indicate that an error has occurred.

Such an implementation within scenario 202 tests for stimulus type events within distributed system 100, whereby information is shared among the machines within network 106 (e.g., a network administrator broadcasts a message to all users or an administrator changes routing tables that control message flow through the Internet).

Figure 3:
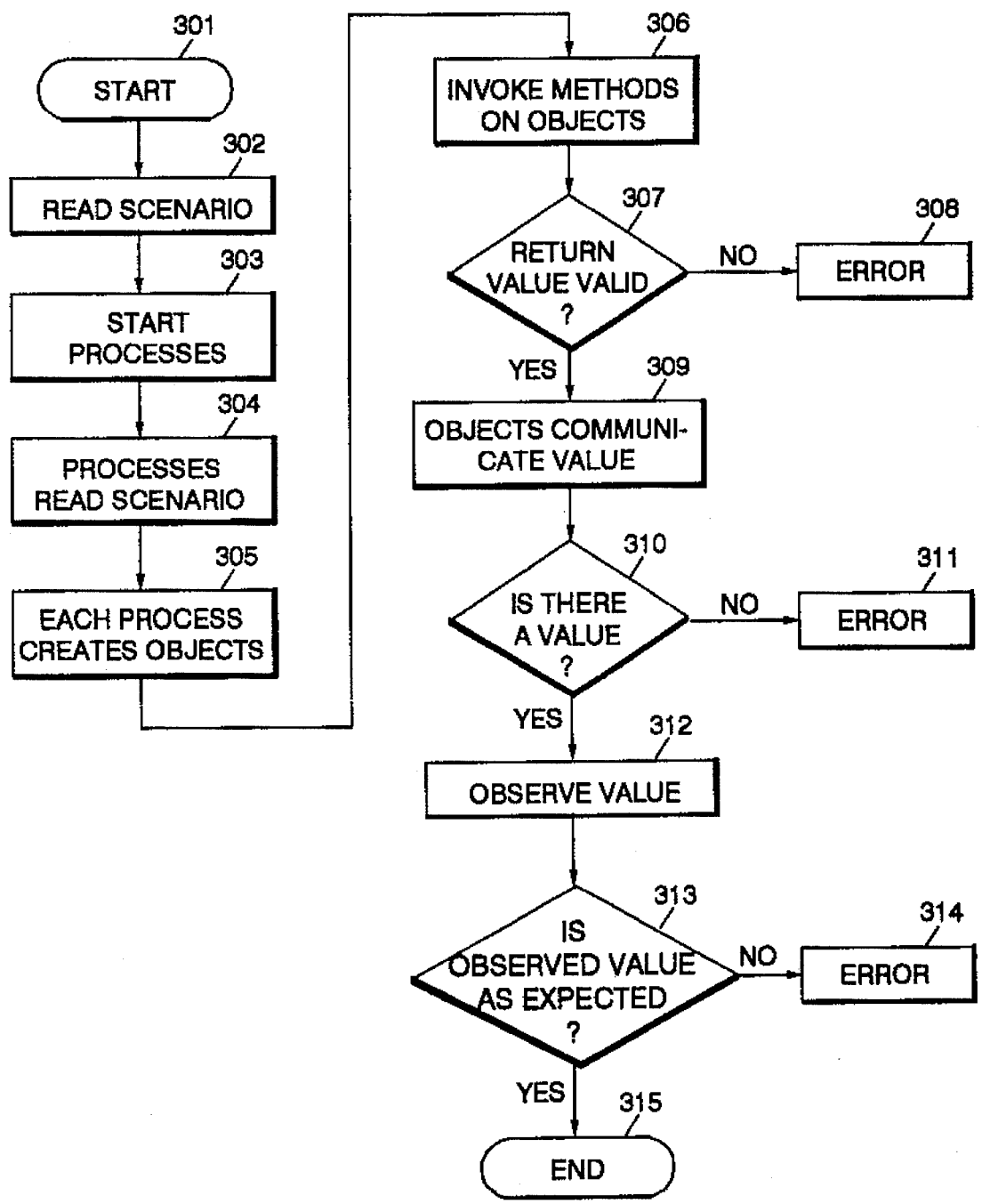
FIG. 3 illustrates a flow diagram illustrating one embodiment of the present invention.

Referring next to FIG. 3, there is illustrated a flow diagram of the aforementioned implementation. At step 301, the process of the present invention begins. At step 302, test manager 201 reads scenario 202. Then, at step 303, processes 1 and 2 are started in order to exercise particular components of the distributed processing system code. Thereafter, at step 304, processes 1 and 2 each read particular portions of scenario 202. At step 305, objects 208 and 209 are created by processes 1 and 2 respectively. At step 306, methods are invoked upon objects 208 and 209 by processes 1 and 2, respectively. At step 307, a determination is made whether or not return value 220 is as expected. If not, test manager 201 indicates an error (step 308).

However, if a return value is as expected, then at step 309, objects 208 and 209 communicate values. At step 310, a timeout process may be implemented so that if process 2 does not receive value "R" within a specified amount of time, an error is designated by test manager 201 (step 311 ).

At step 312, process 2 observes the value, which if the value is not as expected (step 313), then test manager 201 designates an error (step 314). The process then ends at 315.

Figure 4:
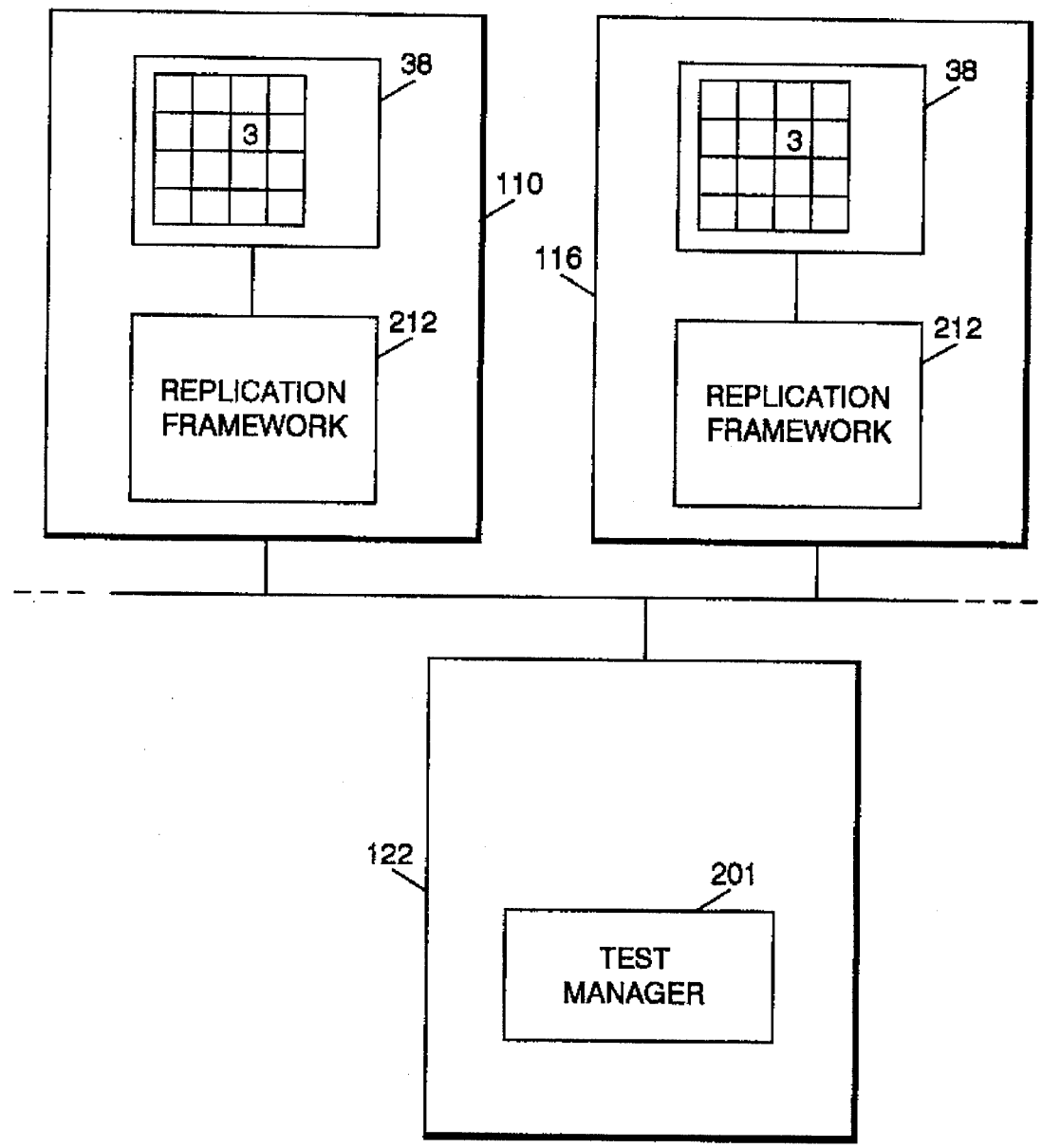
FIG. 4 illustrates another example of the present invention.

Referring next to FIG. 4, there is illustrated another example of an implementation of the present invention wherein replication framework 212 is utilized. Data processing systems 110, 116 and 122 within network 106 may be utilized for testing the distributed system 100.

In this example, a typical spreadsheet program is implemented within machines 110 and 116 and displayed on display 38. For example, it may be assumed that one user on machine 110 may call up a 1994 sales report for display on display 38. A second user on machine 116 may also call up the same 1994 sales report spreadsheet. Simultaneously or not, the two users may begin changing data supported by the spreadsheet, which is replicated to the other machines by replication framework 212. For example, the user on machine 110 may change a cell within the spreadsheet from having a value of two to having a value of three. Asynchronously, replication framework 212 will also copy this change to the 1994 sales report spreadsheet to machine 116 so that the spreadsheet displayed to the second user shows the change to a value three. If replication framework 212 is operating correctly, the object operating within the spreadsheet program on machine 116 should observe the change produced by the object within the spreadsheet program operating on machine 110. This replication may be tested by the utilization of a scenario in accordance with the present invention.

A scenario may be thought of as an act or a drama with a script having two or more actors playing their roles according to the script. As long as each actor correctly plays his role, the script will be followed as written, and the test will be successful. However, if one of the actors forgets his lines, an error occurs. For example, if a value of four comes up in machine 116 instead of a value of three, then there is an error in replication framework 212.

The script may be stored on any one of the machines within network 106, and is called up by test manager 201 running on one of the machines, in this case machine 122. Test manager 201 then begins playing the script as described above.

Figure 5:
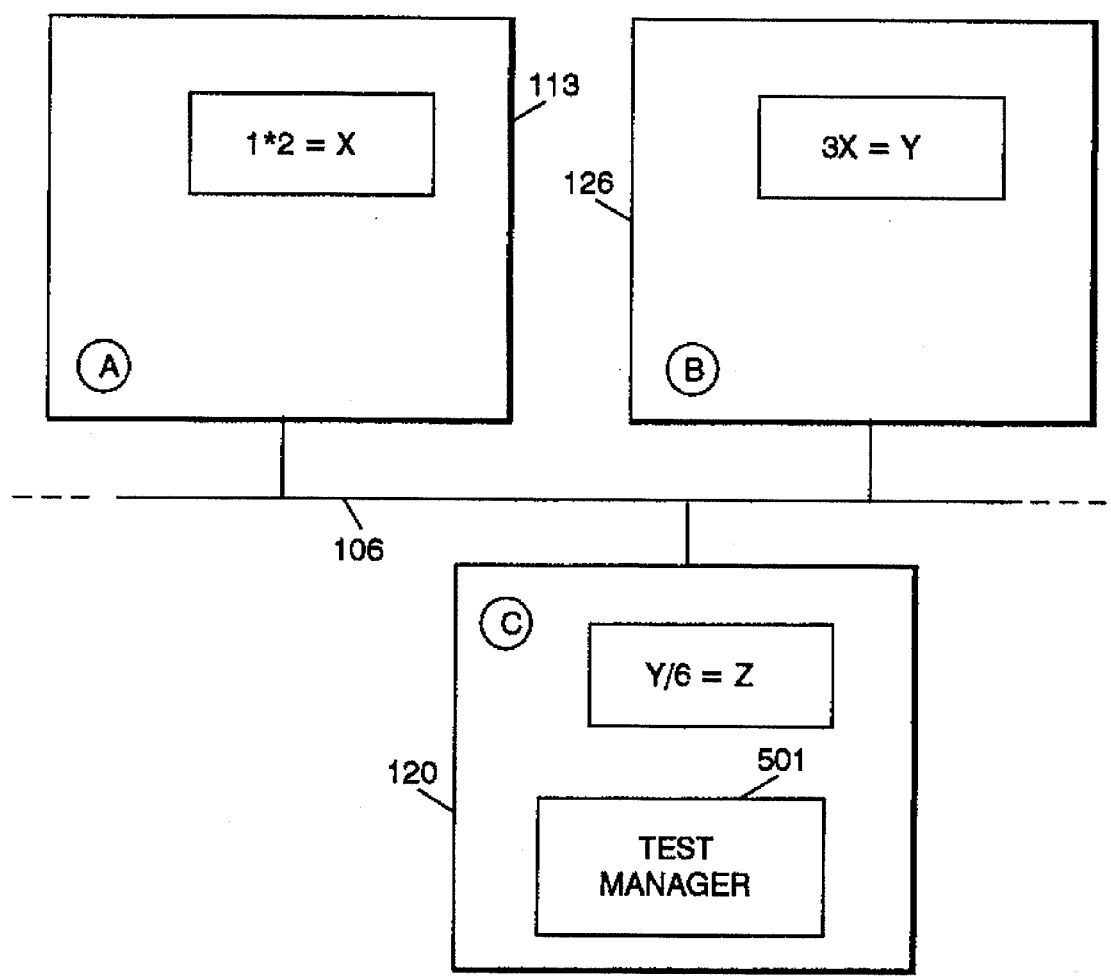
FIG. 5 illustrates another example of the present invention.

Referring next to FIG. 5, there is illustrated another simple but contrived example of the utilization of a script for testing distributed system 100 in accordance with the present invention. In this example, replication framework 212 is not utilized, since distributed system 100 does not utilize replication. However, the present invention may still be utilized within such a system. Assume that the following is the expected behavior of the distributed system. In this example, test manager 501 reads the script stored on any one of the machines within network 106. The script may call for process A to begin running on machine 113 whereby it computes and produces a value x. Then, test manager 501 may initiate a transfer of value x to process B running on machine 126, which multiplies x by 3 to produce a value y. Thereafter, process C running on machine 120 may receive the value y and divide it by 6 to produce a value z. Value z is then transferred back to process A on machine 113 wherein, if the distributed system is operating correctly, value x and value z will be equal. An error may be observed if the results of the test run by test manager 501 do not result in x and z being equal.

Note, many other various scenarios may be implemented within the present invention in order to exercise various components within the program code utilized to implement distributed system 100.

Essentially, a scenario may be written to invoke all sorts of methods on various objects created within system 100, synchronize these various processes, and then check for expected responses.

Without the present invention, the requirement would be to start up two or more separate test programs within two or more machines and then simultaneously run the test programs on each machine, while also attempting to synchronize their interactions. The present invention alleviates this problem by implementing a scenario, which may be started within system 100, allowed to proceed, and then the results of the test reviewed after the scenario has run its course.

The test manager looks for various errors within the distributed programs utilized to implement distributed system 100, such as the dropping of messages, an error in transmissions between various components of network 106, and the occurrence of events in an expected order.

Note, the script may be written in any one of various languages. Furthermore, a script may be written to test various other aspects of distributed processing systems. For example, in the context of testing the replication framework, a scenario could be written to test for recovery when a master process goes down with a write lock. Another one could be written to test recovery when a master process goes down without a write lock.

One of the advantages of the present invention is that any time a change is made in the software of the distributed processing system, a scenario can be quickly written to test the new change.

Further, the present invention could be implemented on a uniprocessor or multiprocessor system and on multiple processes running on one machine.

Although the present invention and its advantages have been described in detail, it should be understood that various changes, substitutions and alterations can be made herein without departing from the spirit and scope of the invention as defined by the appended claims.

What is claimed is:

1. A method for testing a distributed processing system program that is operable within a distributed processing system having a plurality of processing devices, the method comprising the steps of:

a) reading, by a test manager, a scenario file to identify processes of the distributed processing system program to be tested, wherein the scenario file includes identity of the processes and a sequence of testing events relating to the distributed processing system program;

b) starting, by the test manager, the processes on at least one of the plurality of processing devices;

c) reading, by each of the processes, respective portions of the scenario file;

d) performing, by each of the processes, the respective portions of the scenario file; and e) monitoring, by the test manager, outputted values of each of the processes to determine when one of the processes outputs a value that is not as expected.

2. The method of claim 1, wherein step (d) further comprises:

generating, by each of the processes, respective objects, wherein each of the processes has at least one of the respective objects associated therewith;

sending, by one of the processes, a message to the at least one respective object associated therewith, wherein the message invokes a method on the at least one respective object; and producing, by the at least one respective object, a resulting value of the outputted values in response to the message.

3. The method of claim 2 further comprises:

sending, by remaining processes, messages to remaining respective objects;

producing, by the remaining respective objects, respective resulting values;

routing, by a process of the processes, one of the respective resulting values to another one of the processes; and when the one of the respective resulting values is received, processing, by the another one of the processes, the one of the respective resulting values to produce another resulting value of the outputted values.

4. The method of claim 3 further comprises:

when the one of the respective resulting values is not received, producing, by the test manager, an error message indicating that the another one of the processes did not receive the one of the respective resulting values.

5. A system for testing a distributed processing program implemented within a distributed processing system comprising a plurality of data processors coupled by a communications network, said system for testing comprising:

retrieval means for retrieving a scenario from said distributed processing system, wherein said scenario exercises at least one component of said distributed processing program;

identifying means for identifying the at least one component of the distributed processing program from the scenario;

starting means for starting exercising of the at least one component as defined by a respective portion of the scenario; and detecting means for detecting when a result produced by the at least one component, while being exercised by the scenario, is not as expected.

6. The system as recited in claim 5, wherein said distributed processing system implements a replication framework.

7. The system as recited in claim 5, wherein the retrieval means further functions to:

retrieve the scenario from a storage means coupled to said distributed processing system.

8. The system as recited in claim 7, wherein said scenario is in a form of an ASCII text file.

9. The system as recited in claim 7, wherein starting means further functions to:

starting a plurality of processes as the at least one component, wherein each of said plurality of processes retrieves at least a portion of said scenario, said plurality of processes implemented within an object-oriented programming environment, said plurality of processes creating at least one object for invoking a method thereupon to produce a value, wherein the value is monitored by the deleting means.

10. The system as recited in claim 9, wherein said plurality of processes create a plurality of objects that communicate as a result of a replication framework implemented within said distributed processing system.

11. A distributed processing system, comprising:

a communications network interconnecting a plurality of data processing devices;

distributed storage means for storing a distributed processing program wherein the distributed storage means resides within at least some of said plurality of data processing devices; and means for storing a script comprising a text file, said storing means coupled to said communications network;

wherein at least one of said plurality of data processing devices comprises:

means for coupling said at least one of said plurality of data processing device to said communications network;

processor means for:

retrieving the script; reading the script to identify processes of the distributed processing program to be exercised; starting the processes on at least one of the plurality of data processing devices to execute respective portions of the script; and monitoring results from the processes to determine when one of the results is not as expected.

12. A computer readable medium for storing programming instructions, that, when read by a computer which is affiliated with a distributed processing system, causes the computer to perform a test on a distributed processing program that is operable on the distributed processing system, the computer readable medium comprises:

retrieve storage means for storing program instructions that cause the computer to retrieve a test scenario from the distributed processing system;

start storage means for storing program instructions that cause the computer to identify processes of the distributed processing program to be tested by the test scenario and to start at least one processing device of the distributed processing system to support the processes;

read means for storing program instructions that cause the at least one processing device to read respective portions of the test scenario for each of the processes;

object means for storing program instructions that cause the at least one processing device to create an object for each of the processes;

invoke means for storing program instructions that cause the at least one processing device to invoke a method upon the object for each of the processes to create resulting values; and valid means for storing program instructions that cause the computer to determine when one of the resulting values is not as expected.

13. The computer readable medium of claim 12 further comprises:

communication means for storing program instructions that cause the at least one processing device to communicate one of the resulting values from one object to another object; and valid communication means for storing program instructions that cause the computer to determine when the one of the resulting values is not received by the another object.

14. The computer readable medium of claim 13 further comprises:

means for storing program instructions that cause the computer to determine when the one of the resulting values received by the another object is not as expected.

\* \* \* \* \*

UNITED STATES PATENT AND TRADEMARK OFFICE
CERTIFICATE OF CORRECTION

PATENT NO. :     5,544,310

DATED      :     August 6, 1996

INVENTOR(S) :    Forman et al.

It is certified that error appears in the above-indentified patent and that said Letters Patent is hereby corrected as shown below:

Column 7, line 58          Replace "deleting"
                               With --detecting--

Signed and Sealed this

Tenth Day of June, 1997

Attest:

BRUCE LEHMAN

Attesting Officer          Commissioner of Patents and Trademarks